US012789890B2

(12) United States Patent
Hall et al.

(10) Patent No.: US 12,789,890 B2
(45) Date of Patent: Nov. 10, 2026

(54) DRIFT ASSISTANCE SYSTEM FOR A VEHICLE

(71) Applicant: GM Global Technology Operations LLC, Detroit, MI (US)

(72) Inventors: Devon R. Hall, Ann Arbor, MI (US); Trevor Kyle, Farmington Hills, MI (US); Eric E. Krueger, Chelsea, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 128 days.

(21) Appl. No.: 18/889,940

(22) Filed: Sep. 19, 2024

(65) Prior Publication Data

US 2026/0077812 A1 Mar. 19, 2026

(51) Int. Cl.
*B62D 6/00* (2006.01)
*B60K 35/25* (2024.01)

(52) U.S. Cl.
CPC ................ *B62D 6/00* (2013.01); *B60K 35/25* (2024.01)

(58) Field of Classification Search
CPC ................................. B62D 6/00; B60K 35/25
USPC ............................................................ 701/41
See application file for complete search history.

(56) References Cited

U.S. PATENT DOCUMENTS

| | | | | |
|---|---|---|---|---|
| 2015/0298702 A1* | 10/2015 | Reinisch | ................ | G09B 19/16 701/41 |
| 2015/0367701 A1* | 12/2015 | Yamada | .................. | F16F 9/464 701/37 |
| 2018/0257631 A1* | 9/2018 | Fodor | ................... | B60W 10/18 |
| 2025/0091581 A1* | 3/2025 | Yoon | ..................... | B60W 30/02 |

FOREIGN PATENT DOCUMENTS

| | | |
|---|---|---|
| DE | 102013200027 A1 | 7/2014 |
| DE | 102013218828 A1 | 3/2015 |
| DE | 102018105598 A1 | 9/2018 |
| DE | 102022133301 A1 | 6/2023 |

* cited by examiner

*Primary Examiner* — Scott A Reinbold
(74) *Attorney, Agent, or Firm* — Vivacqua Crane, PLLC

(57) ABSTRACT

A drift assistance system that assists a driver of a vehicle in sustaining a drift maneuver includes one or more controllers that each include one or more processors that execute instructions to compare a rotation angle of a hand wheel with a minimum hand wheel angle entry value for a minimum amount of entry time and compare each of a plurality of drift criteria parameters with a corresponding entry value. In response to determining the rotation angle of the hand wheel is greater than the minimum hand wheel angle entry value for the minimum amount of entry time and each of the plurality of drift criteria parameters satisfy their corresponding entry value, the one or more controllers shift an executed position of the hand wheel closer to an ideal drift region associated with the hand wheel so that the drift maneuver is executed successfully.

20 Claims, 3 Drawing Sheets

DRIFT ASSISTANCE SYSTEM FOR A VEHICLE

INTRODUCTION

The present disclosure relates to a drift assistance system for a vehicle that assists a driver in sustaining a drift maneuver. More particularly, the drift assistance system instructs a steer-by-wire system to increase the steering ratio of the vehicle from a nominal steering ratio to sustain the drift maneuver.

Some automotive and motorsports enthusiasts may want to execute a driving maneuver that is commonly referred to as a drift. A vehicle drifts around a turn in the road when a driver intentionally oversteers the vehicle with a loss of traction so that a slip angle corresponding to the vehicle's rear wheels exceeds the slip angle corresponding to the vehicle's front wheels and the front wheels are oriented in a direction away from the turn. However, it is to be appreciated that a relatively high degree of skill is required by a driver to enter and sustain a vehicle in a drift maneuver. Specifically, the driver has to sharply change the angle the hand wheel is oriented at, adjust the powertrain torque to induce and maintain wheel slip, and maintain control of the vehicle around the turn all at the same time to sustain a drift. Accordingly, a driver may need considerable practice and skill to successfully execute a drift maneuver.

Thus, while current vehicles achieve their intended purpose, there is a need in the art for an approach to assist a driver in sustaining a drift maneuver.

SUMMARY

According to several aspects, a drift assistance system that assists a driver of a vehicle in sustaining a drift maneuver is disclosed. The vehicle includes a hand wheel, and the drift assistance system comprising one or more controllers that each include one or more processors that execute instructions to receive a signal indicating a rotation angle of the hand wheel and signals indicating values corresponding to a plurality of drift criteria parameters. The one or more controllers compare the rotation angle of the hand wheel with a minimum hand wheel angle entry value for a minimum amount of entry time, where the minimum hand wheel angle entry value represents a minimum threshold value of the rotation angle of the hand wheel that demonstrates the driver of the vehicle intends to control lateral motion of the vehicle. The one or more controllers compare each of the plurality of drift criteria parameters with a corresponding entry value, and in response to determining the rotation angle of the hand wheel is greater than the minimum hand wheel angle entry value for the minimum amount of entry time and each of the plurality of drift criteria parameters satisfy their corresponding entry value, determine the rotation angle of the hand wheel is within a drift assist region associated with the hand wheel. In response to determining the rotation angle of the hand wheel is within the drift assist region associated with the hand wheel, the one or more controllers shift an executed position of the hand wheel closer to an ideal drift region associated with the hand wheel so that the drift maneuver is executed successfully.

In another aspect, the executed position of the hand wheel determined by the drift assistance system represents a commanded position of the hand wheel that is transmitted to a steer-by-wire system that is part of the vehicle.

In yet another aspect, the one or more controllers execute instructions to continue to monitor the signal indicating the rotation angle of the hand wheel after shifting the executed position of the hand wheel to be closer to the ideal drift region, and in response to determining the rotation angle of the hand wheel falls within the ideal drift region associated with the hand wheel, instruct the steer-by-wire system to increase a steering ratio of the vehicle from a nominal steering ratio.

In an aspect, the one or more controllers execute instructions to continue to instruct the steer-by-wire system to increase the steering ratio of the vehicle from the nominal steering ratio until at least one of the following are satisfied: the rotation angle of the hand wheel falls outside a hand wheel angle exit range for a minimum amount of exit time and when at least one of the plurality of drift criteria parameters satisfy their corresponding exit value.

In another aspect, the plurality of drift criteria parameters includes an amount of braking force the driver of the vehicle exerts upon a brake pedal of the vehicle, a vehicle slip angle, and vehicle speed.

In yet another aspect, the one or more controllers instruct a hand wheel actuator to exert tactile feedback upon the hand wheel in response to determining the rotation angle of the hand wheel is within the drift assist region and the plurality of drift criteria parameters are satisfied.

In an aspect, the ideal drift region associated with the hand wheel represents a range of the rotation angles of the hand wheel that allow for the vehicle to sustain the drift maneuver.

In another aspect, the drift assist region associated with the hand wheel represents a range of the rotation angles of the hand wheel where the executed position of the hand wheel determined by the drift assistance system is shifted towards the ideal drift region so that the drift maneuver is executed successfully.

In yet another aspect, a steering response spline is saved in memory of the one or more controllers, and the steering response spline represents a relationship between an actual position of the hand wheel and the executed position of the hand wheel.

In an aspect, the steering response spline includes a linear region disposed along an x-axis and a non-linear region where the steering response spline includes a non-linear profile.

In another aspect, the non-linear region of the steering response spline includes a drift assist width that corresponds to the drift assist region associated with the hand wheel and an ideal drift width that corresponds to the ideal drift region associated with the hand wheel.

In yet another aspect, the ideal drift region of the steering response spline includes a height measured along the y-axis, where the height of the ideal drift width is indicative of an amount of assistance that the drift assistance system provides to the driver of the vehicle while executing the drift maneuver.

In an aspect, as the height of the ideal drift width of the steering response spline increases, the amount of assistance the drift assistance system provides to the driver of the vehicle while sustaining the drift maneuver increases.

In another aspect, the amount of assistance the drift assistance system provides to the driver refers to a difference between the actual position of the hand wheel and the executed position of the hand wheel.

In yet another aspect, the one or more controllers execute instructions to in response to receiving user input indicating the amount of assistance the drift assistance system provides to the driver of the vehicle is to be reduced, increase the height of the ideal drift width of the of the steering response spline, and in response to receiving user input indicating the amount of assistance the drift assistance system provides to the driver of the vehicle is to be increased, decreasing the height of the ideal drift width of the steering response spline.

In an aspect, a drift assistance system that assists a driver of a vehicle in sustaining a drift maneuver is disclosed. The vehicle includes a hand wheel, and the drift assistance system includes one or more controllers that each include one or more processors that execute instructions to receive a signal indicating a rotation angle of the hand wheel and signals indicating values corresponding to a plurality of drift criteria parameters. The one or more controllers compare the rotation angle of the hand wheel with a minimum hand wheel angle entry value for a minimum amount of entry time, where the minimum hand wheel angle entry value represents a minimum threshold value of the rotation angle of the hand wheel that demonstrates the driver of the vehicle intends to control lateral motion of the vehicle. The one or more controllers compare each of the plurality of drift criteria parameters with a corresponding entry value. In response to determining the rotation angle of the hand wheel is greater than the minimum hand wheel angle entry value for the minimum amount of entry time and each of the plurality of drift criteria parameters satisfy their corresponding entry value, the one or more controllers determine the rotation angle of the hand wheel is within a drift assist region associated with the hand wheel. In response to determining the rotation angle of the hand wheel is within the drift assist region associated with the hand wheel, the one or more controllers shift an executed position of the hand wheel closer to an ideal drift region associated with the hand wheel so that the drift maneuver is executed successfully, where the executed position of the hand wheel determined by the drift assistance system represents a commanded position of the hand wheel that is transmitted to a steer-by-wire system that is part of the vehicle. The one or more controllers continue to monitor the signal indicating the rotation angle of the hand wheel after shifting the executed position of the hand wheel to be closer to the ideal drift region. In response to determining the rotation angle of the hand wheel falls within the ideal drift region associated with the hand wheel, the one or more controllers instruct the steer-by-wire system to increase a steering ratio of the vehicle from a nominal steering ratio.

In another aspect, the one or more controllers execute instructions to continue to instruct the steer-by-wire system to increase the steering ratio of the vehicle from the nominal steering ratio until at least one of the following are satisfied: the rotation angle of the hand wheel falls outside a hand wheel angle exit range for a minimum amount of exit time and when at least one of the plurality of drift criteria parameters satisfy their corresponding exit value.

In yet another aspect, the plurality of drift criteria parameters includes an amount of braking force the driver of the vehicle exerts upon a brake pedal of the vehicle, a vehicle slip angle, and vehicle speed.

In an aspect, the one or more controllers instruct a hand wheel actuator to exert tactile feedback upon the hand wheel in response to determining the rotation angle of the hand wheel is within the drift assist region and the plurality of drift criteria parameters are satisfied.

In an aspect, a drift assistance system that assists a driver of a vehicle in sustaining a drift maneuver is disclosed. The vehicle includes a hand wheel and the drift assistance system includes one or more controllers that each include one or more processors that execute instructions to receive a signal indicating a rotation angle of the hand wheel and signals indicating values corresponding to a plurality of drift criteria parameters, where the plurality of drift criteria parameters includes an amount of braking force the driver of the vehicle exerts upon a brake pedal of the vehicle, a vehicle slip angle, and vehicle speed. The one or more controllers compare the rotation angle of the hand wheel with a minimum hand wheel angle entry value for a minimum amount of entry time, wherein the minimum hand wheel angle entry value represents a minimum threshold value of the rotation angle of the hand wheel that demonstrates the driver of the vehicle intends to control lateral motion of the vehicle. The one or more controllers compare each of the plurality of drift criteria parameters with a corresponding entry value. In response to determining the rotation angle of the hand wheel is greater than the minimum hand wheel angle entry value for the minimum amount of entry time and each of the plurality of drift criteria parameters satisfy their corresponding entry value, the one or more controllers determine the rotation angle of the hand wheel is within a drift assist region associated with the hand wheel. In response to determining the rotation angle of the hand wheel is within the drift assist region associated with the hand wheel, the one or more controllers shift an executed position of the hand wheel closer to an ideal drift region associated with the hand wheel so that the drift maneuver is executed successfully, where the executed position of the hand wheel determined by the drift assistance system represents a commanded position of the hand wheel that is transmitted to a steer-by-wire system that is part of the vehicle. The one or more controllers continue to monitor the signal indicating the rotation angle of the hand wheel after shifting the executed position of the hand wheel to be closer to the ideal drift region. In response to determining the rotation angle of the hand wheel falls within the ideal drift region associated with the hand wheel, the one or more controllers instruct the steer-by-wire system to increase a steering ratio of the vehicle from a nominal steering ratio, and continue to instruct the steer-by-wire system to increase the steering ratio of the vehicle from the nominal steering ratio until at least one of the following are satisfied: the rotation angle of the hand wheel falls outside a hand wheel angle exit range for a minimum amount of exit time and when at least one of the plurality of drift criteria parameters satisfy their corresponding exit value.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
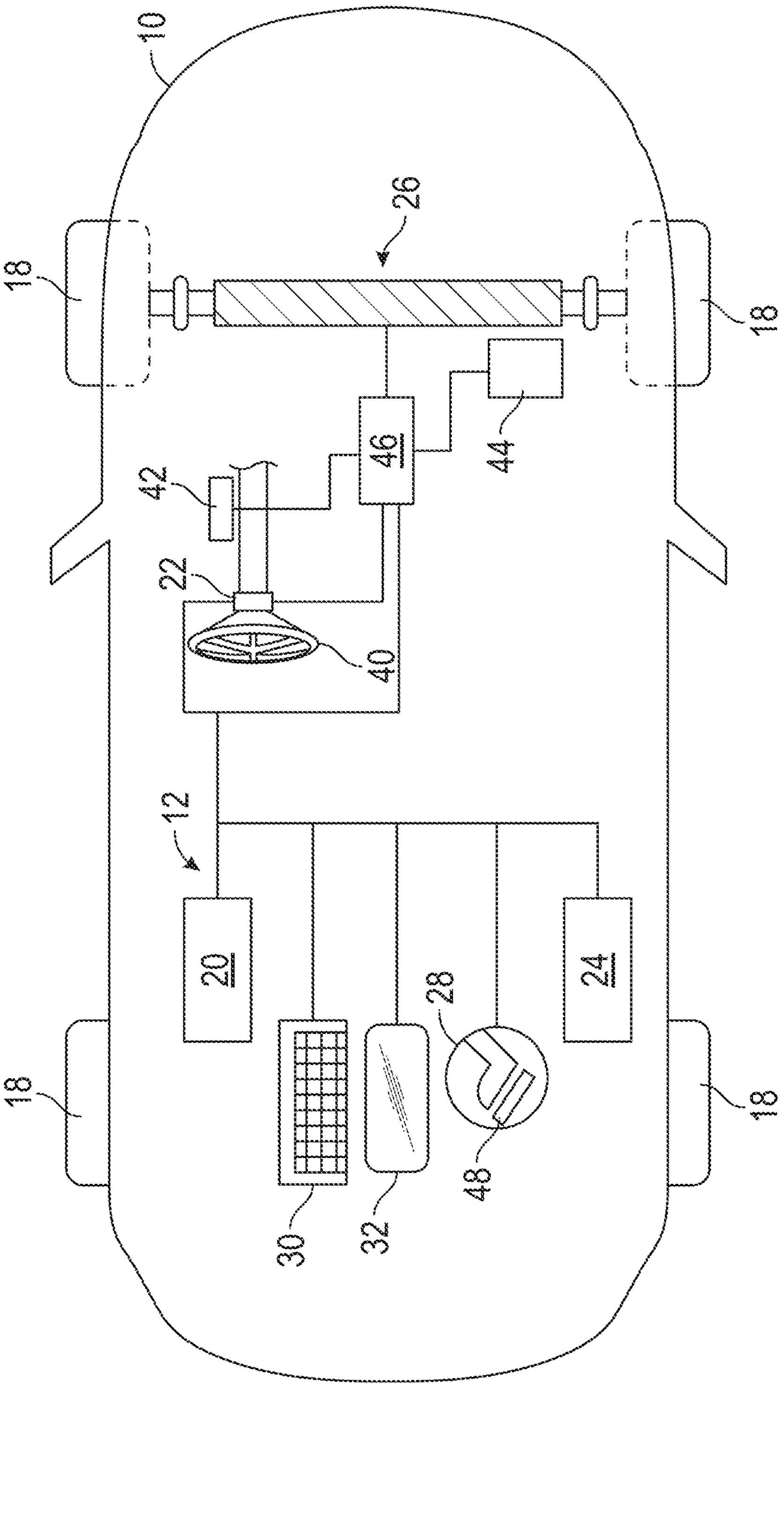
FIG. 1 illustrates a schematic diagram of a vehicle that includes the disclosed drift assistance system having one or more controllers in electronic communication with a hand wheel angle sensor for a hand wheel and a steer-by-wire system, according to an exemplary embodiment.

Referring to FIG. 1, a vehicle 10 including the disclosed drift assistance system 12 is illustrated. As explained below, the drift assistance system 12 assists a driver of the vehicle 10 in sustaining a drift maneuver. It is to be appreciated that the vehicle 10 may be any type of vehicle such as, but not limited to, a sedan, a truck, sport utility vehicle, a customized automobile that has been modified specifically to execute a drift maneuver, coupe, roadster, three-wheeled vehicles, and all-terrain vehicle. The drift assistance system 12 includes one or more controllers 20 in electronic communication with a hand wheel angle sensor 22, one or more vehicle dynamics controllers 24, a steer-by-wire system 26, a brake system 28, a user input device 30, and a display 32.

As seen in FIG. 1, the steer-by-wire system 26 includes the hand wheel angle sensor 22, a hand wheel 40, a hand wheel actuator 42, a road wheel actuator 44, and one or more controllers 46 in electronic communication with the one or more controllers 20, the hand wheel angle sensor 22, the hand wheel actuator 42, and the road wheel actuator 44. The hand wheel 40 receives driver input that indicates an intended direction of the vehicle 10. The hand wheel angle sensor 22 generates an output indicating a rotation angle of the hand wheel 40 relative to a reference or straight-ahead position of the hand wheel 40 of the vehicle 10. The hand wheel actuator 42 applies tactile feedback to the hand wheel 40 of the vehicle 10, and the road wheel actuator 44 converts the driver input into road wheel actuation by manipulating the wheels 18 of the vehicle 10. The road wheel actuator 44 also communicates feedback from the wheels 18 of the vehicle 10 to the hand wheel actuator 42.

A steering ratio of the vehicle 10 is saved in memory of the one or more controllers 46 of the steer-by-wire system 26. The steering ratio refers to the ratio between the turn of the hand wheel 40, which is measured in degrees, and the turn of the wheels 18 of the vehicle 10, which is also measured in degrees. As explained below, the one or more controllers 20 may instruct the one or more controllers 46 of the steer-by-wire system 26 to adjust the steering ratio of the vehicle 10 to assist a driver in sustaining a drift maneuver. Specifically, the one or more controllers 20 instruct the steer-by-wire system 26 to increase the steering ratio of the vehicle 10 from a nominal steering ratio in response to determining the rotation angle of the hand wheel 40 falls within an ideal drift region 50 (shown in FIG. 2) and when a plurality of drift criteria parameters are satisfied. The plurality of drift criteria parameters are described below and are summarized in Table 1. It is to be appreciated that increasing the steering ratio of the vehicle 10 allows for a driver of the vehicle 10 to have greater control over the slip angle of the vehicle 10, thereby assisting the driver in sustaining the drift maneuver.

The one or more controllers 20 receive one or more vehicle dynamics variables from the one or more vehicle dynamics controllers 24. The one or more vehicle dynamics variables are indicative of the motion of the vehicle 10 and include variables such as, but not limited to, vehicle slip angle and vehicle speed. The braking system 28 includes a set of brakes corresponding to each wheel 18 of the vehicle 10. The braking system 28 generates a brake apply signal that is transmitted to the one or more controllers 20, where the brake apply signal indicates an amount of braking force that the driver of the vehicle 10 exerts upon a brake pedal 48 of the vehicle 10. The amount of braking force is expressed as a percentage.

The user input device 30 is any type of device for receiving user input generated by the driver of the vehicle 10 such as, for example, a touchscreen, a keypad, or a microphone. The display 32 shows graphics and images that are visible to the driver of the vehicle 10 and may be, for example, a liquid crystal display (LCD).

Figure 2:
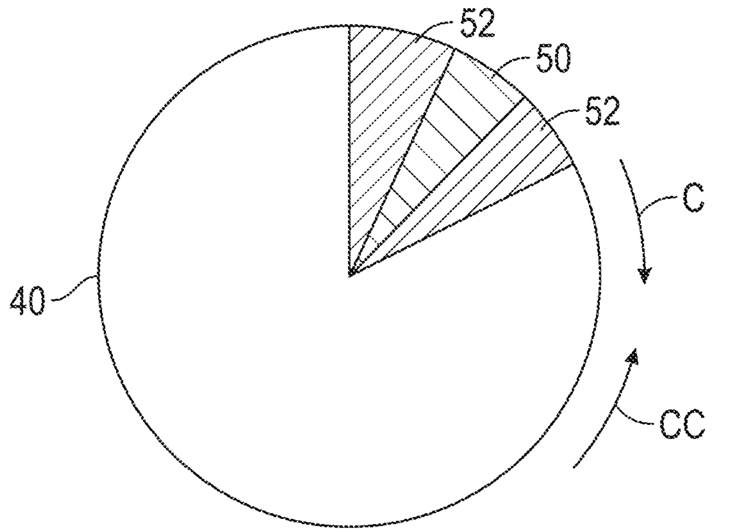
FIG. 2 is a diagram illustrating an ideal drift region and a drift assist region associated with the hand wheel shown in FIG. 1, according to an exemplary embodiment.

FIG. 2 is a diagram illustrating the ideal drift region 50 and a drift assist region 52 associated with the hand wheel 40 shown in FIG. 1. Referring to FIGS. 1 and 2, the ideal drift region 50 represents a range of the rotation angles of the hand wheel 40 that allow for the vehicle 10 to sustain the drift maneuver. When the rotation angle of the hand wheel 40 falls within the ideal drift region 50 and the plurality of drift criteria parameters are satisfied, the one or more controllers 20 instruct the steer-by-wire system 26 to increase the steering ratio of the vehicle 10 from the nominal steering ratio. The range of the rotation angles of the hand wheel 40 that allow for the vehicle 10 to sustain the drift maneuver is a calibratable value that is based on variables that are required to activate an electronic stability control (ESC) system. Specifically, the variables that are required to activate an ESC system include, but are not limited to, road wheel angle, vehicle speed, wheel speed, yaw rate, and axle torque.

It is to be appreciated that for any given vehicle speed v, there exists a range of overall slip angles $\beta_1$-$\beta_2$ of the vehicle 10 that will sustain the drift maneuver, depending upon the axle torque t. It is to be appreciated that the range of overall slip angles $\beta_1$-$\beta_2$ of the vehicle 10 may be estimated based on the linear range of vehicle operation. It is also to be appreciated the vehicle speed v, the axle torque t, and the range of overall slip angles $\beta_1$-$\beta_2$ of the vehicle 10 are dynamic values that change as the vehicle 10 sustains the drift maneuver, and therefore the range of the rotation angles of the hand wheel 40 that are included as part of the ideal drift region 50 also change as the vehicle 10 sustains the drift maneuver. Furthermore, assuming a stable drift maneuver, the vehicle speed v is inversely proportional to the overall slip angle of the vehicle 10, where lower vehicle speeds require higher overall slip angles and higher vehicle speeds require lower overall slip angles. Accordingly, the range of the rotation angles of the hand wheel 40 for the ideal slip region 50 are inversely proportion to the vehicle speed v.

Continuing to refer to FIGS. 1 and 2, the drift assist region 52 represents a range of the rotation angles of the hand wheel 40 where an executed position of the hand wheel 40 determined by the drift assistance system 12 is shifted towards the ideal drift region 50. As explained below and shown in FIG. 4, in one embodiment the range of rotation angles of the hand wheel 40 of the drift assist region 52 is adjustable by a user of the vehicle 10. Referring back to FIGS. 1 and 2, when the rotation angle of the hand wheel 40 is within the drift assist region 52 and the plurality of drift criteria parameters are satisfied, the one or more controllers 20 shift the executed position of the hand wheel 40 determined by the drift assistance system 12 to be closer to the ideal drift region 50 so that the drift maneuver is executed successfully. The executed position of the hand wheel 40 determined by the drift assistance system 12 represents a commanded position of the hand wheel 40 that is transmitted to the steer-by-wire system 26. A successful drift maneuver is sustained vehicle oversteer after the drift entry conditions have been satisfied.

In addition to shifting the executed position of the hand wheel 40, in one embodiment the one or more controllers 20 may also instruct the hand wheel actuator 42 to exert tactile feedback upon the hand wheel 40 in response to determining the rotation angle of the hand wheel 40 is within the drift assist region 52 and the plurality of drift criteria parameters are satisfied. The tactile feedback is exerted upon the hand wheel 40 to encourage or urge the driver to manipulate the hand wheel 40 from the drift assist region 52 towards the ideal drift region 50. Merely by way of example, in one embodiment the tactile feedback includes vibrations that urge the driver of the vehicle 10 to turn the hand wheel 40 towards the ideal drift region 50.

As seen in FIG. 2, the drift assist region 52 of the hand wheel 40 surrounds the ideal drift region 50 of the hand wheel 40. That is, the range of the rotation angles of the hand wheel 40 represented by the drift assist region 52 is greater than the range of rotation angles of the hand wheel 40 represented by the ideal drift region 50. In the example as shown, the hand wheel actuator 42 exerts tactile feedback upon the hand wheel 40 to urge the driver to manipulate the hand wheel 40 in either a clockwise direction C or a counterclockwise direction CC towards the ideal drift region 50 depending upon the current rotation angle of the hand wheel 40.

Referring to FIGS. 1 and 2, the one or more controllers 20 of the drift assistance system 12 receive a signal from the hand wheel angle sensor 22 indicating the rotation angle of the hand wheel 40 and signals indicating values corresponding to the plurality of drift criteria parameters from the one or more vehicle dynamics controllers 24 and the brake system 28. Specifically, the plurality of drift parameters includes the amount of braking force the driver of the vehicle 10 exerts upon a brake pedal 48 of the vehicle 10 from the braking system 28, the vehicle slip angle of the vehicle 10 received from the one or more vehicle dynamics controllers 24, and the vehicle speed received from the one or more vehicle dynamics controllers 24. The one or more controllers 20 compare the rotation angle of the hand wheel 40 (Steering Wheel Angle in Table 1) with a minimum hand wheel angle entry value (SteeringWheelAngleEntryMin in Table 1) for a minimum amount of entry time (EntryTimerMin in Table 1), where the minimum hand wheel angle entry value represents a minimum threshold value of the rotation angle of the hand wheel 40 that demonstrates the driver of the vehicle intends to control lateral motion of the vehicle 10. The minimum amount of entry time is expressed in seconds and represents a minimum threshold amount of time that the vehicle 10 is executing the drift maneuver before the steering ratio of the vehicle 10 is increased.

The one or more controllers 20 also compare each of the plurality of drift criteria parameters with a corresponding entry value as well. Specifically, the one or more controllers 20 compare the amount of braking force (BrakeApply in Table 1) with a brake apply entry value (BrakeApplyEntryMin in Table 1). When the amount of braking force exceeds the brake apply entry value, the vehicle 10 will not be able to sustain the drift maneuver. The one or more controllers 20 compare the absolute value of the vehicle slip angle with a vehicle slip angle entry value (VehicleSlipAngleEntryMin in Table 1), where the vehicle slip angle entry value part of a one-dimensional look-up table with corresponding values for vehicle speed saved in memory of the one or more controllers 20. The vehicle slip angle entry value is selected to indicate the driver of the vehicle 10 is initiating the drift maneuver in either a right-hand side direction or a left-hand side direction. The one or more controllers 20 compare the vehicle speed with a minimum speed entry value (VehicleSpeedEntryMin in Table 1), where the minimum speed entry value is selected so as to be slow enough to support drift maneuvers having a relatively tight radius (i.e., donuts) but is greater than a minimum speed exit value, which is explained below, to avoid hysteresis.

In response to determining the rotation angle of the hand wheel 40 is greater than the minimum hand wheel angle entry value for the minimum amount of entry time and each of the plurality of drift criteria parameters satisfy their corresponding entry value, the one or more controllers 20 determine the rotation angle of the hand wheel 40 is within the drift assist region 52, and shifts the executed position of the hand wheel 40 to be closer to the ideal drift region 50 so that the drift maneuver is executed successfully. Specifically, the plurality of drift criteria parameters satisfy their corresponding entry values when the amount of braking force is less than the brake apply entry value, and an absolute value of the vehicle slip angle is greater than the vehicle slip angle entry value, and the vehicle speed is greater than the minimum speed entry value. As mentioned above, in one embodiment in addition to shifting the executed position of the hand wheel 40, in one embodiment the one or more controllers 20 may also instruct the hand wheel actuator 42 to exert the tactile feedback upon the hand wheel 40 in response to determining the rotation angle of the hand wheel 40 is within the drift assist region 52 and each of the plurality of drift criteria parameters satisfy their corresponding entry value.

The one or more controllers 20 continue to monitor the signal from the hand wheel angle sensor 22 indicating the rotation angle of the hand wheel 40 after shifting the executed position of the hand wheel 40 to be closer to the ideal drift region 50. In response to determining the rotation angle of the hand wheel 40 falls within the ideal drift region 50 of the hand wheel 40, the one or more controllers 20 then instruct the steer-by-wire system 26 to increase the steering ratio of the vehicle 10 from the nominal steering ratio.

It is to be appreciated that the drift assistance system 12 continues to instruct the steer-by-wire system 26 to increase the steering ratio of the vehicle 10 from the nominal steering ratio until the rotation angle of the hand wheel 40 falls outside a hand wheel angle exit range for a minimum amount of exit time (SWAExitTimerMin in Table 1), or when at least one of the plurality of drift criteria parameters satisfy their corresponding exit value. Once the rotation angle of the hand wheel 40 falls outside the hand wheel angle exit range for the minimum amount of exit time, or when at least one of the plurality of drift criteria parameters satisfy their corresponding exit value, the one or more controllers 20 instruct the steer-by-wire system 26 to set the steering ratio back to its nominal value. Specifically, the one or more controllers 20 compare the rotation angle of the hand wheel 40 with the hand wheel angle exit range for the minimum amount of exit time. The hand wheel angle exit range indicates the rotation angle of the hand wheel 40 falls outside of the drift assist region 52 and includes a minimum hand wheel exit value and a maximum hand wheel exit value.

The minimum hand wheel exit value is a difference between an absolute value of the lower limit of the drift assist region 52 (Abs (Drift Assist Region Lower Limit in Table 1) and a minimum hand wheel exit value (SWALowExit in Table 1). The minimum hand wheel exit value is part of a one-dimensional look-up table with corresponding values for vehicle speed saved in memory of the one or more controllers 20. The minimum hand wheel exit value is indicative of the driver of the vehicle 10 no longer executing the drift maneuver. The maximum hand wheel exit value is a difference between an absolute value of the lower limit of the drift assist region 52 and a maximum hand wheel exit value (SWAHighExit in Table 1). The maximum hand wheel exit value is also part of a one-dimensional look-up table with corresponding values for vehicle speed saved in memory of the one or more controllers 20. The maximum hand wheel exit value is indicative of the driver of the vehicle 10 no longer executing the drift maneuver. The minimum amount of exit time represents a threshold amount of time that the rotation angle of the hand wheel 40 falls outside of the drift assist regions 52 and is calibrated so that the drift assistance system 12 does not toggle in and out of increasing the steering angle ratio.

The corresponding exit values for the plurality of drift criteria parameters shall now be described. A minimum speed exit value (VehicleSpeedExitMin in Table 1) corresponds to the vehicle speed and indicates the minimum speed that the vehicle 10 maintains the drift maneuver. As mentioned above, the minimum speed exit value is less than the minimum speed entry value to avoid hysteresis. In response to determining the vehicle speed is less than the minimum speed exit value, the one or more controllers 20 determine the vehicle speed satisfies its corresponding exit value. A vehicle slip angle exit value (VehicleSlipAngleExitMin in Table 1) corresponds to the vehicle slip angle and is part of a one-dimensional look-up table that includes corresponding values for vehicle speed saved in memory of the one or more controllers 20. The vehicle slip angle exit value represents a minimum slip angle that is required for the vehicle 10 to sustain the drift maneuver. In response to determining an absolute value of the vehicle slip angle is less than the vehicle slip angle exit value for a minimum amount of slip angle exit time (VehicleSlipAngleExitTimeMin in Table 1), the one or more controllers 20 determine the vehicle slip angle satisfies its corresponding exit value. A brake apply exit value (BrakeApplyExitMin in Table 1) corresponds to the amount of braking force and indicates a value where the vehicle 10 may no longer sustain the drift maneuver. In response to determining the amount of braking force is greater than the brake apply exit value, the one or more controllers 20 determine the amount of braking force satisfies its corresponding exit value. As mentioned above, the corresponding entry values and the corresponding exit values for the plurality of drift criteria parameters are summarized in Table 1 below.

TABLE 1

Figure 3:
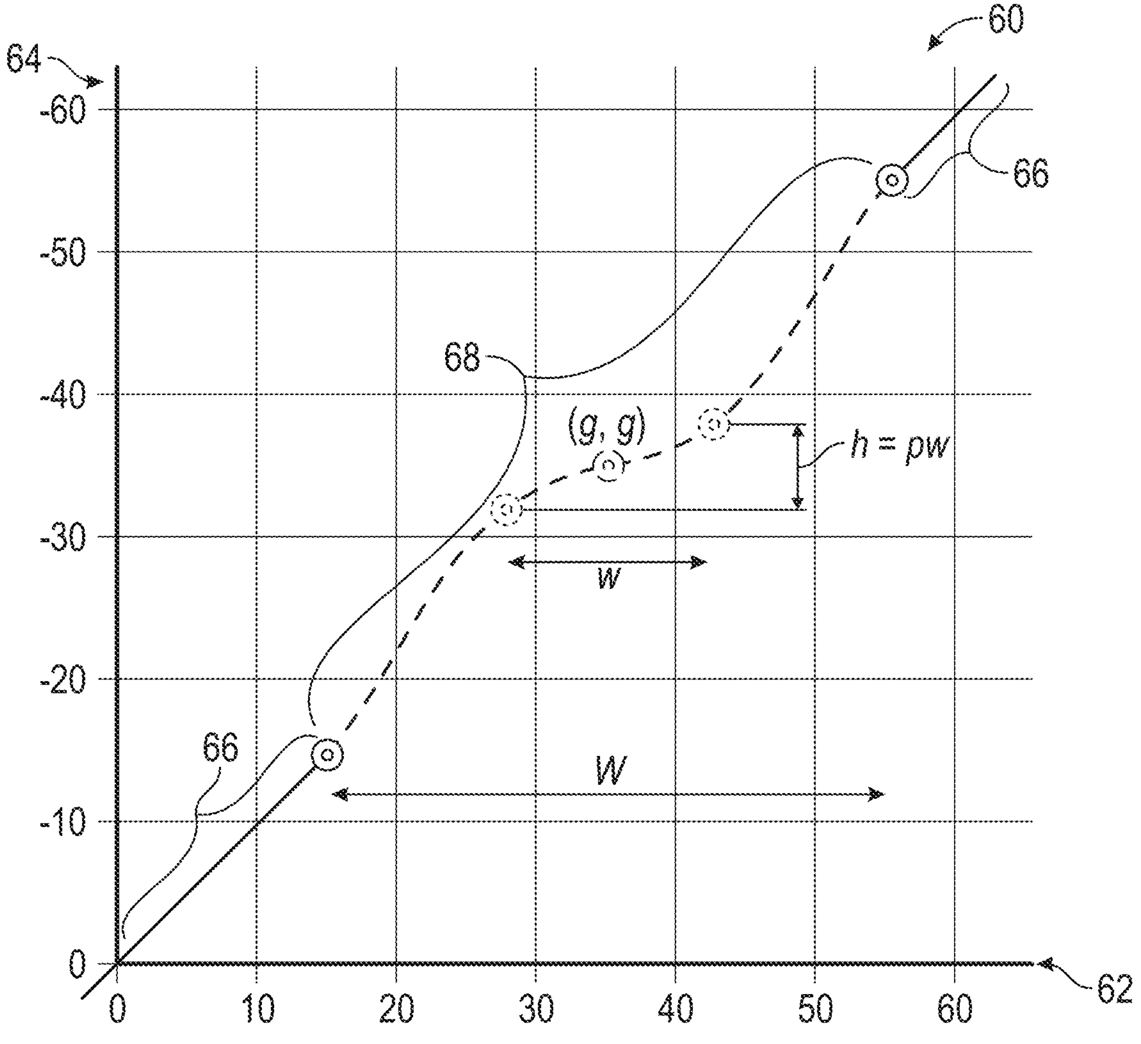
FIG. 3 is an illustration of an exemplary steering response spline that represents a relationship between an actual position of the hand wheel and the executed position of the hand wheel, according to an exemplary embodiment.

Corresponding Entry Values
Brake Apply < BrakeApplyEntryMin &&
[Abs(Vehicle Slip Angle) > VehicleSlipAngleEntryMin && Steering Wheel Angle > SteeringWheelAngleEntryMin] for Timer > Entry TimerMin && Vehicle Speed > VehicleSpeedEntryMin
Corresponding Exit Values
Vehicle Speed < VehicleSpeedExitMin ||
Abs(Vehicle Slip Angle) < VehicleSlipAngleExitMin for Timer > VehicleSlipAngleExitTimerMin||
Steering Wheel Angle < (Abs(Drift Assist Region Lower Limit) − SWALowExit) ||
Steering Wheel Angle > (Abs(Drift Assist Region Lower Limit) + SWAHighExit) for Timer > SWAExitTimerMin ||
Brake Apply > BrakeApplyExitMin FIG. 3 is an exemplary illustration of a steering response spline 60 saved in memory of the one or more controllers 20 (FIG. 1), where the steering response spline 60 that represents a relationship between an actual position of the hand wheel 40, which is measured in degrees, and the executed position of the hand wheel 40, which is also measured in degrees. Specifically, as seen in FIG. 3, the actual position of the hand wheel 40 is plotted along an x-axis 62 and the executed position of the hand wheel 40 is plotted along a y-axis 64. The steering response spline 60 includes a linear region 66 and a non-linear region 68. The linear region 66 represents where the steering response spline 60 includes a linear profile and the non-linear region 68 represents where the steering response spline 60 includes a curved or non-linear profile. The non-linear region 68 of the steering response spline 60 includes a drift assist width W that corresponds to the drift assist region 52 (FIG. 2) associated with the hand wheel 40 and an ideal drift width w that corresponds to the ideal drift region 50 (FIG. 2) associated with the hand wheel 40. As seen in FIG. 3, the drift assist width W corresponding to the drift assist region 52 is greater than the ideal drift width w corresponding to the ideal drift region 50, and the ideal drift width w falls completely within the drift assist width W.

The ideal drift region w of the steering response spline 60 also includes a height h measured along the y-axis 64, where the height h of the ideal drift width w of the steering response spline 60 is the product of the ideal drift width w and a compression ratio p, or h=pw. The height h of the ideal drift width w is indicative of the amount of assistance that the drift assistance system 12 provides to the driver of the vehicle 10 while executing the drift maneuver. Specifically, as the height h of the ideal drift width w of the steering response spline 60 increases, the amount of assistance the drift assistance system 12 provided to the driver of the vehicle 10 while sustaining the drift maneuver decreases, and as the height h of the ideal drift width w of the steering response spline 60 decreases or becomes flatter, the amount of assistance the drift assistance system 12 provided to the driver of the vehicle 10 while sustaining the drift maneuver increases. The amount of assistance refers to the difference between the actual position of the hand wheel 40 and the executed position of the hand wheel 40. As an example, when the actual position of the hand wheel 40 is about equal to the executed position of the hand wheel 40 that is sent to the steer-by-wire system 26, then almost no additional assistance is provided to the driver while attempting to execute the drift maneuver.

Equations 1-8 summarize the relationship between the actual position of the hand wheel 40 and the executed position of the hand wheel 40 of the steering response spline 60, which are as follows $$y = ax^5 + bx^4 + cx^3 + dx^2 + ex + f \quad \text{Equation 1}$$

where $$\frac{W}{w} \geq \frac{\sqrt{1 + p\sqrt{\frac{1-p}{p^2}}}}{p} \quad \text{Equation 2}$$

-continued $$a = \frac{16(p-1)}{(W^2-w^2)^2}$$ Equation 3

$$b = \frac{80(g-pg)}{(W^2-w^2)^2}$$ Equation 4

$$c = -\frac{8(pW^2-20pg^2-W^2+20g^2)}{(W^2-w^2)^2}$$ Equation 5

$$d = -\frac{8(3W^2g+20pg^3-20g^3-3pgW^2)}{(W^2-w^2)^2}$$ Equation 6

Equation 7

$$e = \frac{pW^4+80pg^4-80g^4+w^4+24W^2g^2-2W^2w^2-24pW^2g^2}{(W^2-w^2)^2}$$

$$f = \frac{(W-2g)(W+2g)^2(Wg+2pg^2-2g^2-pWg)}{(W^2-w^2)^2}$$ Equation 8 where y represents the executed position of the hand wheel 40 along the steering response spline 60, x represents the actual position of the hand wheel 40 along the steering response spline, and g represents a central point of the ideal drift width w.

Figure 4:
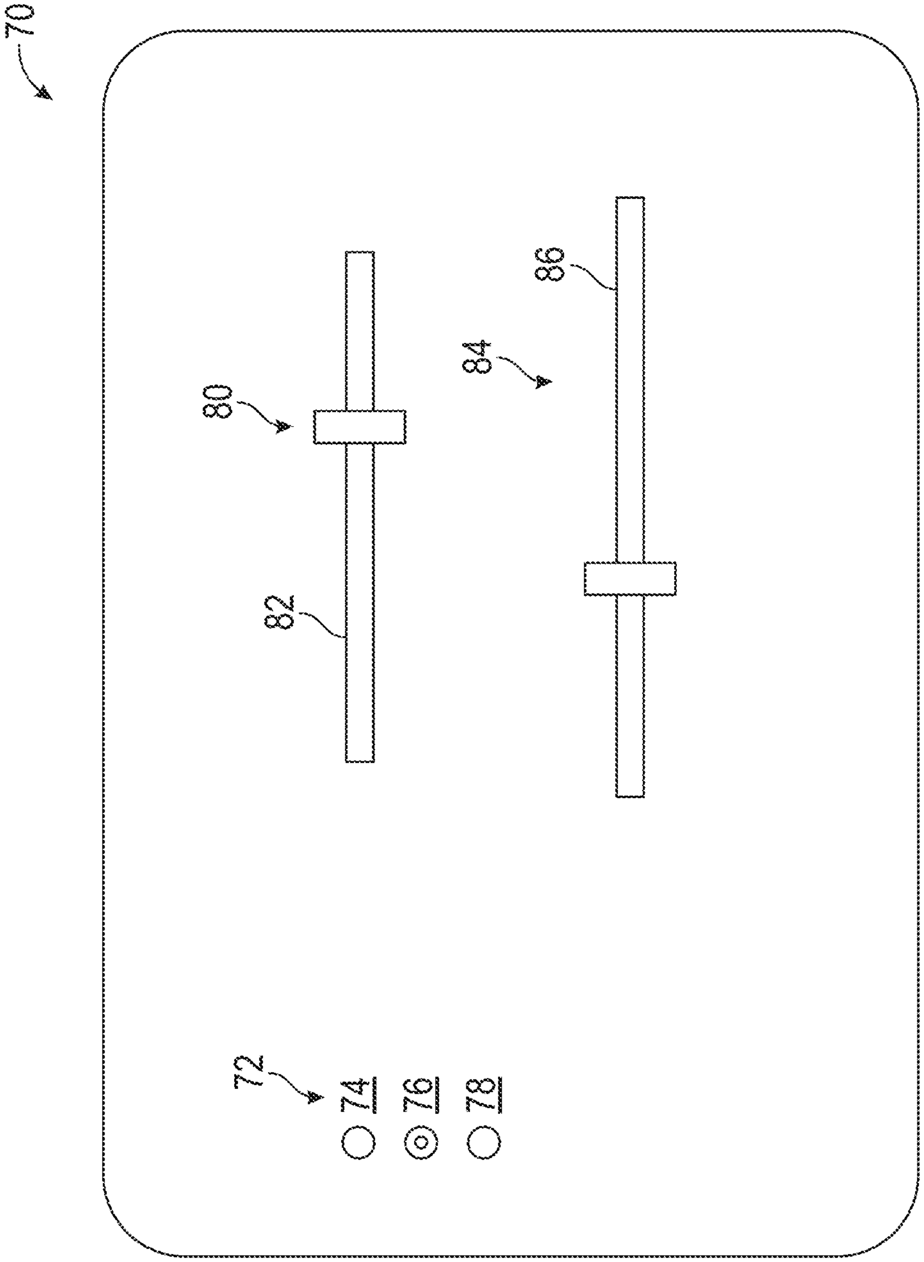
FIG. 4 is an illustration of an exemplary graphic generated by the one or more controllers in FIG. 1 that is shown upon a display of the drift assistance system, according to an exemplary embodiment.

In one embodiment, the amount of assistance the drift assistance system 12 provided to the driver of the vehicle 10 while sustaining the drift maneuver is an adjustable value that is modified in response to receiving a user input from the user input device 30 (FIG. 1) of the vehicle 10. FIG. 4 is an illustration of an exemplary graphic 70 generated by the one or more controllers 20 that are shown upon the display 32 of the drift assistance system 12. The graphic 70 includes a menu 72 that includes an off button 74, an automatic button 76, and a manual button 78, where the automatic button 76 has been selected. Referring to FIGS. 1 and 4, in response to receiving a user input generated by the user from the user input device 30 indicating the off button 74 is selected, the one or more controllers 20 turn off the drift assistance system 12. In response to receiving a user input from the user input device 30 indicating the automatic button 76 is selected, the one or more controllers 20 operate the drift assistance system 12 in an automatic mode that does not require any additional input from the user to initiate increasing the steering ratio provided to the steer-by-wire system 26.

In contrast to the automatic mode, in response to receiving a user input from the user input device 30 indicating the manual button 78 selected, the drift assistance system 12 operates in manual mode and requires additional user input before instructing the steer-by-wire system 26 to increase the steering ratio of the vehicle 10 from the nominal steering ratio. The additional user input may be any type of user-initiated selection such as, for example, a paddle pull performed upon the paddle shifter attached to the hand wheel 40.

The graphic 70 also includes a user selectable control 80 that allows for the user to adjust the range of rotation angles of the hand wheel 40 of the drift assist region 52 (FIG. 2). In the example as shown in FIG. 4, the user selectable control 80 is a slide bar 82, where moving the slide bar 82 to the right increases the range of rotation angles and moving the slide bar 82 to the left decreases the range of rotation angles of the hand wheel 40.

The graphic 70 also includes a user selectable control 84 that allows for the user to adjust the amount of assistance the drift assistance system 12 provided to the driver of the vehicle 10 while sustaining the drift maneuver increases, which may be referred to as the amount of assist aggression. Specifically, referring to FIGS. 1-4, in response to the one or more controllers 20 receiving user input from the user input device 30 indicating the amount of assistance the drift assistance system 12 provides to the driver of the vehicle 10 is to be reduced, the height h of the ideal drift width w increases. Similarly, in response to the one or more controllers 20 receiving user input from the user input device 30 indicating the amount of assistance the drift assistance system 12 provide to the driver of the vehicle 10 is to be increased, the height h of the ideal drift width w of the steering response spline 60 shown in FIG. 3 decreases. In the example as shown in FIG. 4, the user selectable control 84 is a slide bar 86, where moving the slide bar 86 to the right increases the amount of assistance the drift assistance system 12 provides to the driver of the vehicle 10 and moving the slide bar 86 to the left decreases the amount of assistance the drift assistance system 12 provides to the driver of the vehicle 10.

Referring generally to the figures, the disclosed drift assistance system provides various technical effects and benefits. Specifically, the disclosed drift assistance system provides an approach to assist a driver in sustaining a drift maneuver by increasing the steering ratio of the vehicle. It is to be appreciated that the drift assistance system is implemented without additional hardware and only requires changes to the vehicle's software. In one embodiment, the disclosed drift assistance system also includes a manual mode that requires additional user input before increasing the steering ratio of the vehicle from the nominal steering ratio. The drift assistance system may also include selectable controls that allow the driver to set and modify the amount of assistance the drift assistance system provided to the driver of the vehicle while sustaining the drift maneuver. The selectable controls may be used as a training tool by the driver to gradually reduce the amount of assistance provided to the driver by the drift assistance system as the driver becomes more proficient over time in sustaining a drift maneuver.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A drift assistance system that assists a driver of a vehicle in sustaining a drift maneuver, wherein the vehicle includes a hand wheel, the drift assistance system comprising:

one or more controllers that each include one or more processors that execute instructions to:

receive a signal indicating a rotation angle of the hand wheel and signals indicating values corresponding to a plurality of drift criteria parameters;

compare the rotation angle of the hand wheel with a minimum hand wheel angle entry value for a minimum amount of entry time, wherein the minimum hand wheel angle entry value represents a minimum threshold value of the rotation angle of the hand wheel that demonstrates the driver of the vehicle intends to control lateral motion of the vehicle;

compare each of the plurality of drift criteria parameters with a corresponding entry value;

in response to determining the rotation angle of the hand wheel is greater than the minimum hand wheel angle entry value for the minimum amount of entry time and each of the plurality of drift criteria parameters satisfy their corresponding entry value, determine the rotation angle of the hand wheel is within a drift assist region associated with the hand wheel; and in response to determining the rotation angle of the hand wheel is within the drift assist region associated with the hand wheel, shift an executed position of the hand wheel closer to an ideal drift region associated with the hand wheel so that the drift maneuver is executed successfully, wherein the ideal drift region associated with the hand wheel represents a range of the rotation angles of the hand wheel that allow for the vehicle to sustain the drift maneuver.

2. The drift assistance system of claim 1, wherein the executed position of the hand wheel determined by the drift assistance system represents a commanded position of the hand wheel that is transmitted to a steer-by-wire system that is part of the vehicle.

3. The drift assistance system of claim 2, wherein the one or more controllers execute instructions to:

continue to monitor the signal indicating the rotation angle of the hand wheel after shifting the executed position of the hand wheel to be closer to the ideal drift region; and in response to determining the rotation angle of the hand wheel falls within the ideal drift region associated with the hand wheel, instruct the steer-by-wire system to increase a steering ratio of the vehicle from a nominal steering ratio.

4. The drift assistance system of claim 3, wherein the one or more controllers execute instructions to:

continue to instruct the steer-by-wire system to increase the steering ratio of the vehicle from the nominal steering ratio until at least one of the following are satisfied: the rotation angle of the hand wheel falls outside a hand wheel angle exit range for a minimum amount of exit time and when at least one of the plurality of drift criteria parameters satisfy their corresponding exit value.

5. The drift assistance system of claim 1, wherein the plurality of drift criteria parameters includes an amount of braking force the driver of the vehicle exerts upon a brake pedal of the vehicle, a vehicle slip angle, and vehicle speed.

6. The drift assistance system of claim 1, wherein the one or more controllers instruct a hand wheel actuator to exert tactile feedback upon the hand wheel in response to determining the rotation angle of the hand wheel is within the drift assist region and the plurality of drift criteria parameters are satisfied.

7. The drift assistance system of claim 1, wherein the ideal drift region associated with the hand wheel represents a range of the rotation angles of the hand wheel that allow for the vehicle to sustain the drift maneuver.

8. The drift assistance system of claim 1, wherein the drift assist region associated with the hand wheel represents a range of the rotation angles of the hand wheel where the executed position of the hand wheel determined by the drift assistance system is shifted towards the ideal drift region so that the drift maneuver is executed successfully.

9. The drift assistance system of claim 1, wherein a steering response spline is saved in memory of the one or more controllers, and wherein the steering response spline represents a relationship between an actual position of the hand wheel and the executed position of the hand wheel.

10. The drift assistance system of claim 9, wherein the steering response spline includes a linear region disposed along an x-axis and a non-linear region where the steering response spline includes a non-linear profile.

11. The drift assistance system of claim 10, wherein the non-linear region of the steering response spline includes a drift assist width that corresponds to the drift assist region associated with the hand wheel and an ideal drift width that corresponds to the ideal drift region associated with the hand wheel.

12. The drift assistance system of claim 11, wherein the ideal drift region of the steering response spline includes a height measured along the y-axis, wherein the height of the ideal drift width is indicative of an amount of assistance that the drift assistance system provides to the driver of the vehicle while executing the drift maneuver.

13. The drift assistance system of claim 12, wherein as the height of the ideal drift width of the steering response spline increases, the amount of assistance the drift assistance system provides to the driver of the vehicle while sustaining the drift maneuver increases.

14. The drift assistance system of claim 12, wherein the amount of assistance the drift assistance system provides to the driver refers to a difference between the actual position of the hand wheel and the executed position of the hand wheel.

15. The drift assistance system of claim 12, wherein the one or more controllers execute instructions to:

in response to receiving user input indicating the amount of assistance the drift assistance system provides to the driver of the vehicle is to be reduced, increase the height of the ideal drift width of the of the steering response spline; and in response to receiving user input indicating the amount of assistance the drift assistance system provides to the driver of the vehicle is to be increased, decreasing the height of the ideal drift width of the steering response spline.

16. A drift assistance system that assists a driver of a vehicle in sustaining a drift maneuver, wherein the vehicle includes a hand wheel, the drift assistance system comprising:

one or more controllers that each include one or more processors that execute instructions to:

receive a signal indicating a rotation angle of the hand wheel and signals indicating values corresponding to a plurality of drift criteria parameters;

compare the rotation angle of the hand wheel with a minimum hand wheel angle entry value for a minimum amount of entry time, wherein the minimum hand wheel angle entry value represents a minimum threshold value of the rotation angle of the hand wheel that demonstrates the driver of the vehicle intends to control lateral motion of the vehicle;

compare each of the plurality of drift criteria parameters with a corresponding entry value;

in response to determining the rotation angle of the hand wheel is greater than the minimum hand wheel angle entry value for the minimum amount of entry time and each of the plurality of drift criteria parameters satisfy their corresponding entry value, determine the rotation angle of the hand wheel is within a drift assist region associated with the hand wheel;

in response to determining the rotation angle of the hand wheel is within the drift assist region associated with the hand wheel, shift an executed position of the hand wheel closer to an ideal drift region associated with the hand wheel so that the drift maneuver is executed successfully, wherein the executed position of the hand wheel determined by the drift assistance system represents a commanded position of the hand wheel that is transmitted to a steer-by-wire system that is part of the vehicle, and wherein the ideal drift region associated with the hand wheel represents a range of the rotation angles of the hand wheel that allow for the vehicle to sustain the drift maneuver;

continue to monitor the signal indicating the rotation angle of the hand wheel after shifting the executed position of the hand wheel to be closer to the ideal drift region; and in response to determining the rotation angle of the hand wheel falls within the ideal drift region associated with the hand wheel, instruct the steer-by-wire system to increase a steering ratio of the vehicle from a nominal steering ratio.

17. The drift assistance system of claim 16, wherein the one or more controllers execute instructions to:

continue to instruct the steer-by-wire system to increase the steering ratio of the vehicle from the nominal steering ratio until at least one of the following are satisfied: the rotation angle of the hand wheel falls outside a hand wheel angle exit range for a minimum amount of exit time and when at least one of the plurality of drift criteria parameters satisfy their corresponding exit value.

18. The drift assistance system of claim 16, wherein the plurality of drift criteria parameters includes an amount of braking force the driver of the vehicle exerts upon a brake pedal of the vehicle, a vehicle slip angle, and vehicle speed.

19. The drift assistance system of claim 16, wherein the one or more controllers instruct a hand wheel actuator to exert tactile feedback upon the hand wheel in response to determining the rotation angle of the hand wheel is within the drift assist region and the plurality of drift criteria parameters are satisfied.

20. A drift assistance system that assists a driver of a vehicle in sustaining a drift maneuver, wherein the vehicle includes a hand wheel, the drift assistance system comprising:

one or more controllers that each include one or more processors that execute instructions to:

receive a signal indicating a rotation angle of the hand wheel and signals indicating values corresponding to a plurality of drift criteria parameters, wherein the plurality of drift criteria parameters includes an amount of braking force the driver of the vehicle exerts upon a brake pedal of the vehicle, a vehicle slip angle, and vehicle speed;

compare the rotation angle of the hand wheel with a minimum hand wheel angle entry value for a minimum amount of entry time, wherein the minimum hand wheel angle entry value represents a minimum threshold value of the rotation angle of the hand wheel that demonstrates the driver of the vehicle intends to control lateral motion of the vehicle;

compare each of the plurality of drift criteria parameters with a corresponding entry value;

in response to determining the rotation angle of the hand wheel is greater than the minimum hand wheel angle entry value for the minimum amount of entry time and each of the plurality of drift criteria parameters satisfy their corresponding entry value, determine the rotation angle of the hand wheel is within a drift assist region associated with the hand wheel;

in response to determining the rotation angle of the hand wheel is within the drift assist region associated with the hand wheel, shift an executed position of the hand wheel closer to an ideal drift region associated with the hand wheel so that the drift maneuver is executed successfully, wherein the executed position of the hand wheel determined by the drift assistance system represents a commanded position of the hand wheel that is transmitted to a steer-by-wire system that is part of the vehicle, and wherein the ideal drift region associated with the hand wheel represents a range of the rotation angles of the hand wheel that allow for the vehicle to sustain the drift maneuver;

continue to monitor the signal indicating the rotation angle of the hand wheel after shifting the executed position of the hand wheel to be closer to the ideal drift region;

in response to determining the rotation angle of the hand wheel falls within the ideal drift region associated with the hand wheel, instruct the steer-by-wire system to increase a steering ratio of the vehicle from a nominal steering ratio; and continue to instruct the steer-by-wire system to increase the steering ratio of the vehicle from the nominal steering ratio until at least one of the following are satisfied: the rotation angle of the hand wheel falls outside a hand wheel angle exit range for a minimum amount of exit time and when at least one of the plurality of drift criteria parameters satisfy their corresponding exit value.

* * * * *